United States Patent [19]

Ingvarsson et al.

[11] Patent Number: 5,683,076
[45] Date of Patent: Nov. 4, 1997

[54] LEAF SPRING FOR A RIGID AXLE OF A VEHICLE

[75] Inventors: Henrik Ingvarsson, Onsala; Jan-Erik Raattamaa, Göteborg, both of Sweden

[73] Assignee: AB Volvo, Gothenburg, Sweden

[21] Appl. No.: 464,756

[22] PCT Filed: Dec. 22, 1993

[86] PCT No.: PCT/SE93/01102

§ 371 Date: Aug. 7, 1995

§ 102(e) Date: Aug. 7, 1995

[87] PCT Pub. No.: WO94/14626

PCT Pub. Date: Jul. 7, 1994

[30] Foreign Application Priority Data

Dec. 22, 1992 [SE] Sweden .................. 9203881-9

[51] Int. Cl.⁶ .................................................. B60G 11/04
[52] U.S. Cl. .................................................. 267/47
[58] Field of Search .................. 267/36.1, 45, 47, 267/52, 158, 260, 262, 283; 288/121–123, 137, 694, 699, 718–720

[56] References Cited

U.S. PATENT DOCUMENTS

| 3,079,139 | 2/1963 | Greene et al. | |
|---|---|---|---|
| 4,676,488 | 6/1987 | Castaing | |
| 5,209,518 | 5/1993 | Heckeuliable et al. | 267/47 |
| 5,366,238 | 11/1994 | Stephens | 267/47 |
| 5,507,516 | 4/1996 | Deast | 280/718 |

FOREIGN PATENT DOCUMENTS

| 2 316 311 | 10/1974 | Germany . | |
|---|---|---|---|
| 8703122 | 7/1989 | Netherlands | 267/47 |
| WO90/03281 | 4/1990 | WIPO . | |
| WO94/14626 | 7/1994 | WIPO . | |

Primary Examiner—Robert S. Oberleitner
Assistant Examiner—Chris Schwartz
Attorney, Agent, or Firm—Young & Thompson

[57] ABSTRACT

A leaf spring for suspension of a rigid axle of a vehicle. The spring is joined at its first and second ends to a frame of a vehicle. The spring has a first portion extending from a first end to the junction with the axle in which the thickness of the spring increases along a parabolic curve from a first starting value at the first end to a first maximum value at the juncture with the axle, and a second portion which has a thickness which increases along a parabolic curve from the same first starting value at the second end to a second maximum value at the junction with the axle, the second maximum value being less than the first maximum value so that the stiffness of the first portion is greater than the stiffness of the second portion to such an extent that the radius of curvature of a path along which the axle is moving during flexing of the spring is increased by at least 5% compared to a corresponding spring having substantially the same first and second maximum values. Alternatively, the maximum values may be the same and the starting values may differ.

8 Claims, 2 Drawing Sheets

5,683,076

LEAF SPRING FOR A RIGID AXLE OF A VEHICLE

BACKGROUND OF THE INVENTION

The invention relates to a leaf spring for suspension of a rigid axle of a vehicle, said spring being joined at a first end to the vehicle frame or the like by junction means permitting pivotal movement about a pivot axis essentially parallel to the axle, and being joined at the other second end to the frame by junction means which permit pivotal movement about a pivot axis essentially parallel to the axle and displacement in the longitudinal direction of the spring, said spring being rigidly joined intermediate its ends to the axle.

Leaf springs of the type described above are widely used to suspend rigid axles in vehicles of varying types, primarily heavy vehicles such as trucks and the lake. The springs are used in pairs with one spring on either side of the vehicle near the ends of the axle.

A common type of spring for the area of application described above is the so-called taper leaf spring. This spring consists of one or more leaves, at least the main leaf of which is designed in such a manner that the cross-sectional moment of inertia of the leaf varies in the longitudinal direction of the sprang, so that the bending stress in the leaf will be essentially equal over the major portion of the length of the leaf. Such a distribution of bending stress is achieved if the bending resistance of the leaf increases linearly as seen from the ends of the leaf towards the juncture of the spring with the axle.

A disadvantage of all leaf springs of the type described above is, however, that the axle, when absorbing loads, is not displaced up and down along a straight line but rather along a curved path. This means that the axle in addition to moving vertically will also move in the longitudinal direction of the vehicle as the load changes. If the movement of the springs is different on one side of the vehicle from the other, the displacement of the axle in the longitudinal direction of the vehicle will be different between the two sides. This means that the axle will be set obliquely and have a steering effect on the vehicle. This so-called roll steering affects the driving properties of the vehicle, and it is desirable to reduce this effect as much as possible.

SUMMARY OF THE INVENTION

The purpose of the invention as to provide a leaf spring of the type described by way of introduction, which creates very little roll steering and other effects on the driving properties of the vehicle, at the same time as one can maintain relatively large deflection and thus good comfort.

That described above is achieved by means of a leaf spring which is characterized by the features disclosed in the characterizing clause of claim 1.

BRIEF DESCRIPTION OF THE DRAWINGS

The invention will be described in more detail below with reference to the accompanying drawings, of which

DESCRIPTION OF THE PREFERRED EMBODIMENTS

Figure 1:
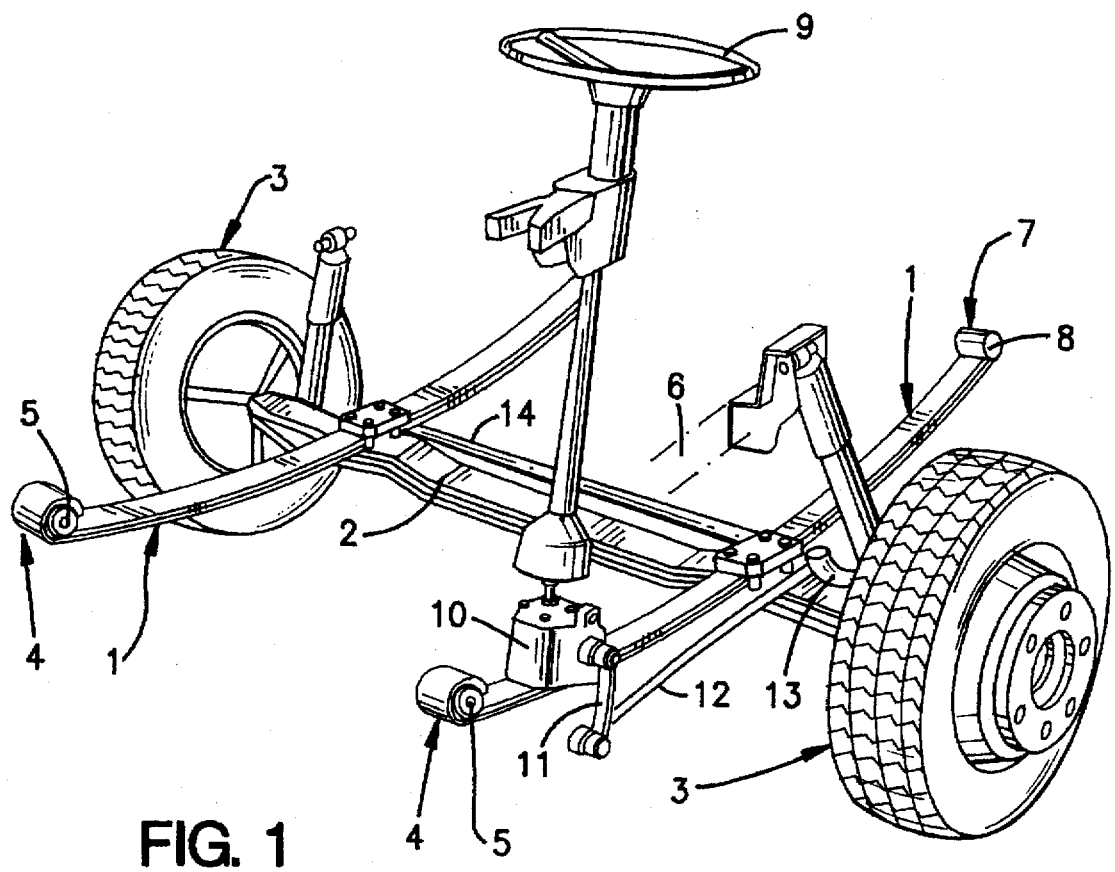
FIG. 1 is a perspective view of a rigid axle and its suspension components in a vehicle.

FIG. 1 shows a common type of front end construction for a heavy vehicle, for example a truck. It includes two springs 1, which are designed to suspend a rigid axle 2 which supports two wheels 3. The two springs 1 are essentially identical, and each of the springs 1 is joined at its first end 4 to the frame of the vehicle or the like by juncture means (not shown), which permit pivoting of the spring about a pivot axis lying essentially parallel to the axle 2, and which is represented in FIG. 1 by a transverse hole 5 in the first end 4 of the spring. The juncture means can consist of a bolt, which is inserted through the hole 5 and is supported by the vehicle frame. Only a small portion thereof is shown at 6 in FIG. 1, while the rest of the parts have been left out to make the relevant parts clearly visible.

The other end 7 of each spring is joined to the frame 6 by juncture means (not shown), which permit the spring 1 to pivot about a pivot axis lying essentially parallel to the axle 2, and permitting the end 7 to be displaced in the longitudinal direction of the spring 1. The juncture means can consist of a sprang shackle of conventional type, comprising a bolt extending through a hole 8 in the end 7 of the spring, and is pivotally joined to the frame 6.

FIG. 1 also shows a steering device with a steering wheel 9 which actuates a steering gear 10, which is fixed to the frame 6. The steering gear 10 is provided with an output shaft, supporting a Pitman arm 11, which, by means of a link rod 12, is joined to a steering am 13, which is fixed to the wheel 3 to steer the same. There is also a tie rod 14 to transmit the steering movements to the wheel 3 on the other side of the vehicle.

FIG. 1 also shows other parts included in the front end of the vehicle, but these parts are of minor importance to the invention and therefore will not be described in more detail here.

The springs 1 shown in FIG. 1 are each composed of two spring leaves, but the principles of the invention can also be applied to springs with one leaf or with more than two leaves.

Figure 2:
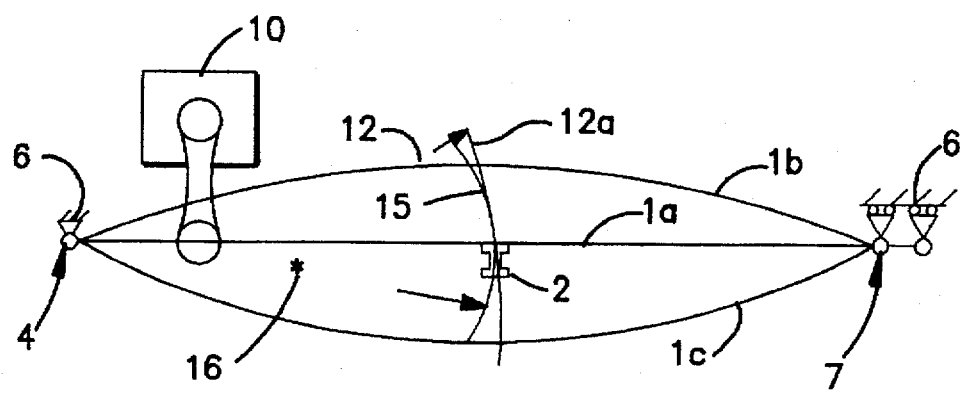
FIG. 2 is a schematic side view of a spring and its pattern of movement.

FIG. 2 shows schematically the pattern of movement of a spring 1 when absorbing loads. The line 1a shows the spring 1 in an intermediate position, while the line 1b shows the spring 1 under full load, and the line 1c shows the spring unloaded. As mentioned previously, the first end 4 of the spring 1 is non-displaceably joined to the frame 6, while the other end 7 of the spring 1 is joined to the frame 6 in such a manner as to permit longitudinal displacement of the spring. This means that the axle 2, which is fixed to the intermediate portion of the spring 1, will follow a curved path 15 as the spring moves. The centre of curvature 16 of said curved path is located at a relatively great distance from the first end 4 of the spring. The sharper the curvature of the path 15 is, the larger will be the so-called roll steering as a result of the longitudinal displacement of the axle 2.

A reduction in the curvature of the path 15, i.e. displacing the centre of curvature 16 towards the first end 4 of the spring 1, provides a reduction in vehicle roll steering. This is achieved according to the invention by means of a leaf spring, where the stiffness varies in various portions of the spring.

Figure 3:
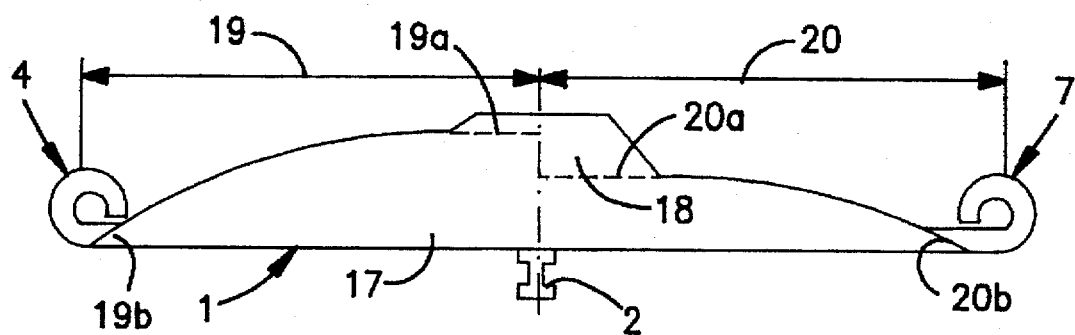
FIG. 3 is a schematic side view of a spring according to one embodiment of the invention.

A first embodiment of a leaf spring 1 according to the invention is shown in FIG. 3 in very schematic form. For the sake of simplicity, only one spring leaf 17 is shown, the thickness of which is greatly exaggerated in FIG. 3, and the underside of which is shown in a planar state. The middle portion of the spring leaf 17, where the axle 2 is to be mounted, has a thicker portion 18 which gives the spring leaf 17 constant thickness in this portion. The thicker portion 18 is designed for purely practical reasons and does not constitute a part of the invention.

The spring leaf 17 has a first portion 19 which extends between the first end 4 and the juncture with the axle 2, and a portion 20 which extends between the juncture with the axle 2 and the second end 7. The thickness of the spring leaf 17 in the first portion 19 increases significantly more sharply from the first end 4 towards the juncture with the axle 2, than the thickness of the second portion 20 increases from the second end 7 towards the juncture with the axle 2. The desired design of the portions 19 and 20 at the middle of the spring leaf 17 is shown with dashed lines 19a and 20a, respectively, while the practical design is shown with the solid line. Also, the desired design at the ends 4 and 7 is shown with the dashed lines 19b and 20b. For practical reasons, the thickness of the ends 4 and 7 is made the same and is a starting value from which the thickness of the spring leaf 17 increases. In this manner, the moment of inertia of the sprang leaf 17 increases from the ends 4 and 7 towards the juncture with the axle 2.

Figure 4:
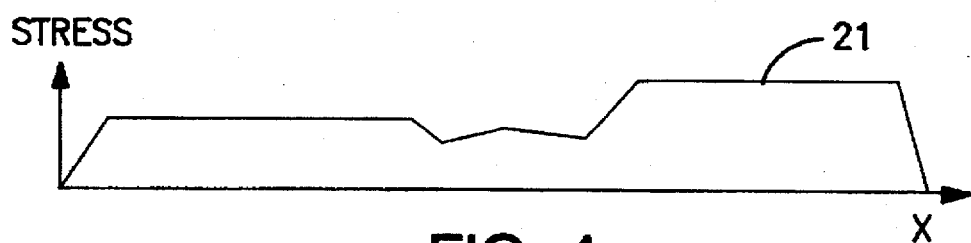
FIG. 4 is a diagram showing the stress distribution in the spring according to FIG. 3.

When the spring leaf 17, shown in FIG. 3, is loaded, a stress distribution in the spring leaf 17 is achieved which is shown by the stress curve 21 in FIG. 4. It is evident therefrom that with a suitable dimensioning of the thickness in the two portions 19 and 20 of the spring leaf 17, it is possible to achieve in these portions moments of inertia which provide essentially constant stress. For this, the thickness of the first portion 19 and of the second portion 20 must increase along a parabolic curve. As is evident from FIG. 4, what is achieved with the design of the spring leaf 17 in accordance with FIG. 3 is a lower stress in the first portion 19 than in the second portion 20. This means that the spring leaf 17 is stiffer in the first portion 19 than in the second potion 20, This also means that the first portion 19 will not change its shape as the spring moves as much as the second portion 20, which in turn means that the centre of curvature 16 (FIG. 2) will be closer to the first end 4 than what is the case with a parabolic taper leaf spring with the same stiffness in both portions.

Increasing the radius of curvature of the path 15, i.e. the distance between the path 15 and the centre of curvature 16, by 15-20% achieves a quite tangible reduction in vehicle roll steering, but an increase which is as little as 5-7% also provides a positive effect.

Figure 5:
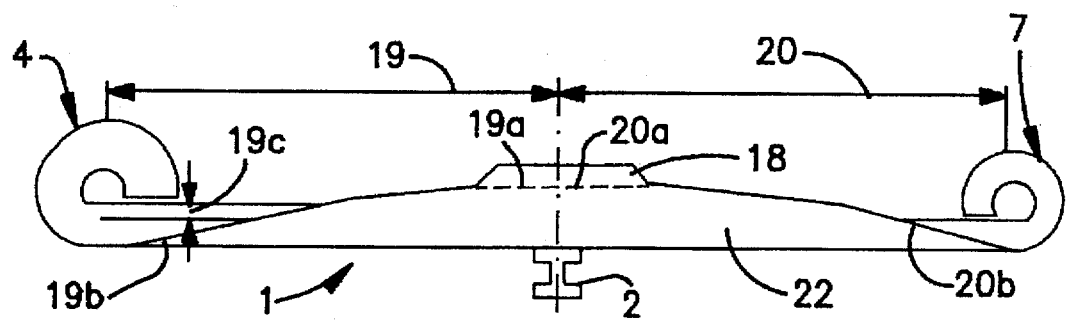
FIG. 5 is a schematic side view of a spring according to a second embodiment of the invention.
Figure 6:
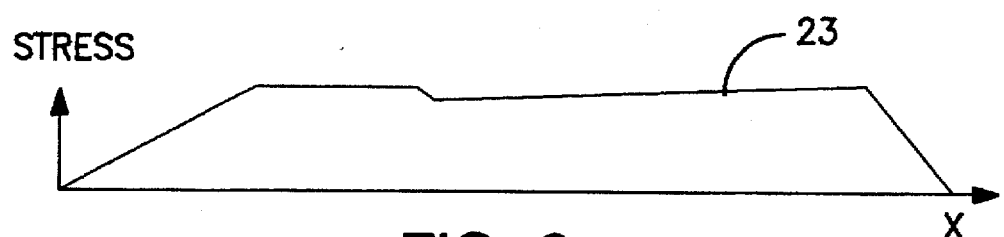
FIG. 6 is a diagram which shows the stress distribution in the spring according to FIG. 5.

FIG. 5 shows a spring leaf 22 according to a second embodiment of the invention. The spring leaf 22 has a thicker portion 18 in its middle part at the juncture with the axle 2. This thicker portion does non constitute any pard of the invention. The desired design of the portions 19 and 20 at the juncture with the axle 2 is shown with the dashed line 19a, 20a, and at the ends 4 and 7 with the dashed lines 19b and 20b, respectively. The first portion 19 of the spring leaf 22 and its second portion 20 are made with varying thickness, the thickness of the two portions varying along the same curve, which preferably is a parabolic curve. The increased stiffness in the first portion 19 has been achieved by making the thickness of the material in the first end 4 greater than the thickness of the material in the second end 7, as is indicated by,he arrow 19c. This means that the increase of the thickness in the first portion 19 begins first at a greater distance from the first end 4, while the increase of the thickness of the second portion 20 begins at a shorter distance from the second end 7. This design of the spring leaf 22 provides moments of inertia which give a stress distribution as shown in the stress curve 23 in FIG. 6. The lower stress in the first portion 19 closest to the first end 4 means that the first portion 19 will have greater stiffnees than the second portion 20.

The above descriptions of the spring leaf 17 according to FIG. 3 and the spring leaf 22 according to FIG. 5 apply of course provided that the spring leaves have constant width, since the cross-sectional area of the spring leaves affect the moments of inertia and the pattern of movement of the spring leaves when loaded. It is thus also conceivable to vary the width of the spring leaves instead of the thickness, or in combination with a change in the thickness.

With a leaf spring according to the invention, it is possible to achieve a reduction in the disadvantageous roll steering while essentially retaining the other characteristics of the spring. An additional advantage which is obtained with a leaf spring according to the invention is that the curve 15 which the axle 2 follows in its spring movements, approaches the curve 12a which the end of the link rod 12 remote from the steering gear 10 follows during load absorbing movements of the axle 2. By virtue of the fact that the curves 15 and 12a have come closer to each other than what is the case in the known parabolic taper leaf spring, there is less effect on the steering of the vehicle with the same placement of the steering gear 10. Since it is often not possible to freely select the placement of the steering gear 10, due to a lack of a space for example, this reduced effect on the steering is advantageous.

The invention is of course not limited to the examples described above. Rather changes can be made within the scope of the following patent claims. For example, it is possible to combine the embodiments according to FIGS. 3 and 5, i.e. making a spring leaf both with different starting values of the thickness at the ends of the two portions and different maximum values of the thickness of the two portions at the juncture with the axle.

Furthermore, it is also possible to place the juncture with the axle in another marker than what is shown in the drawing, which would mean that the two portions of the spring would have different lengths. In such a spring is preferable that the longer of the two portions of the spring is placed towards the front of the vehicle in which the spring is mounted.

It is also possible to make a spring according invention with more than one spring leaf. In this case, it is suitable to make all of the spring leaves in accordance with the invention, but it is also possible make one or more of the spring leaves according to the invention while having the other spring leaves be of conventional type, i.e. taper leaf spring type.

We claim:

1. A leaf spring for suspension of a rigid axle (2) of a vehicle, said spring (1) adapted to be joined at a first end (4) to a vehicle frame and adapted to be joined at the other second end (7) to the frame, said spring (1) adapted to be rigidly joined intermediate its ends to an axle, said spring (1) in a first portion (19), which extends between the first end (4) and a juncture with the axle (2), having a thickness which from a first starting value at the first end (4) increases to a first maximum value at the juncture with the axle (2), and in a second portion (20), extending between the juncture with the axle (2) and the second end (7), having a thickness which from the first starting value at the second end (7) increases to a second maximum value at the juncture with the axle (2), wherein the thickness of the spring (1) in each of the first and second portions (19, 20) increases along a parabolic curve, and in that the first maximum value is greater than the second maximum value so that the stiffness of the first portion (19) is greater than the stiffness of the second portion (20) to such an extent, that the radius of curvature of a path (15), along which the axle (2) is moving during flexing of the spring (1), is increased by at least 5% compared to a corresponding spring having substantially the same first and second maximum values.

2. The leaf spring according to claim 1, wherein the spring (1) has essentially constant width from the first end (4) to the second end (7).

3. The leaf spring according to claim 1, wherein the spring (1) comprises more than one spring leaf.

4. The leaf spring according to claim 1, wherein the first portion (19) of the spring is adapted to be mounted towards the front of the vehicle.

5. The leaf spring according to claim 1, wherein the first portion (19) of the spring (1) is longer than the second portion (20).

6. A leaf spring for suspension of a rigid axle of a vehicle, said spring adapted to be joined at a first end to a vehicle frame and adapted to be joined at the other second end to the frame, said spring adapted to be rigidly joined intermediate its ends to an axle, said spring in a first portion, which extends between the first end and a juncture with the axle, having a thickness which from a first starting value at the first end increases to a first maximum value at the juncture with the axle, and in a second portion, extending between the juncture with the axle and the second end, having a thickness which from a second starting value at the second end increases to the first maximum value at the juncture with the axle, wherein thickness of the spring in each of the first and second portions increases along a parabolic curve, and in that the first starting value is greater than the second starting value so that the stiffness of the first portion is greater than the stiffness of the second portion to such an extent, that the radius of curvature of a path, along which the axle is moving during flexing of the spring, is increased by at least 5% compared to a corresponding spring having substantially the same first and second maximum values.

7. The leaf spring according to claim 1, wherein the radius of curvature of the path along which the axle is moving during flexing of the spring is increased by at least 7% compared to a corresponding spring having substantially the same first and second maximum values.

8. A leaf spring having two portions of substantially equal length extending from a center portion of the spring to respective ends of the spring, a first end of the spring being permitted pivotal movement and a second end of the spring being permitted pivotal and displacement motion, wherein each of said two portions has a thickness which varies parabolically and the thickness of one of said two portions varies more than the other of said two portions, so that a radius of curvature of a path along which the center portion moves when the spring is flexing is increased by at least 5% compared to a corresponding spring in which the two portions have the same variation in thickness.

* * * * *